2,784,232
Patented Mar. 5, 1957

2,784,232

HYDROGENATION OF FATTY NITRILES USING A NICKEL BORATE CATALYST

David E. Terry and Jakob L. Jakobsen, Minneapolis, Minn., assignors to General Mills, Inc., a corporation of Delaware No Drawing. Application July 5, 1951,
Serial No. 235,384

3 Claims. (Cl. 260—583)

The present invention relates to an improved process for the preparation of fatty amines, both primary and secondary fatty amines, and more particularly to the reduction of fatty nitriles in the presence of a reduced nickel borate catalyst.

Various catalysts have been employed in the reduction of fatty nitriles to fatty amines. In general these catalysts have been found to be specific for the preparation of either primary or secondary fatty amines. Accordingly, a catalyst specific for the conversion of fatty nitriles to the corresponding primary amines has been of little or no value in the production of secondary amines. Likewise, catalysts specific for the preparation of secondary amines have not been adaptable to the commercial manufacture of primary amines. It has been found that the reduced nickel borate catalyst of the present invention is very versatile and lends itself to the commercial production of either fatty primary or secondary amines. Hence, it is possible to control the conversion of fatty nitriles to fatty amines so that the desired type of amine is produced to the substantial exclusion of the other.

It is therefore an object of the present invention to provide a process of preparing fatty amines in excellent yields by means of a reduced nickel borate catalyst.

It is another object of the present invention to provide a process of producing high yields of either primary fatty amines or secondary fatty amines by reducing fatty nitriles in the presence of a reduced nickel borate catalyst under controlled reaction conditions.

Other objects and advantages will become apparent from the following discussion of the invention.

The invention is applicable to the reduction of nitriles containing 8 or more carbon atoms. Since these nitriles are usually derived from fatty acids, the nitriles which are employed are those containing from 8 to 22 carbon atoms, and most often are composed predominantly of those containing from 8 to 18 carbon atoms. The invention is applicable to individual isolated nitriles, to mixtures of nitriles derived from the mixed fatty acids of a fat or oil, or to any segregated group of nitriles derived from such fatty acids. Where a mixed group of nitriles is employed in the process, it will be apparent that a mixture of products will result. The invention is applicable to nitriles containing saturated fatty groups as well as to nitriles containing unsaturated fatty groups. The unsaturated fatty groups are not reduced to any substantial extent during the hydrogenation and accordingly the invention is applicable to the production of saturated as well as unsaturated amines.

The catalyst which is employed is a reduced nickel borate catalyst. The catalyst may be prepared by precipitating nickel borate from aqueous solution in the presence of an inert carrier such as asbestos, diatomaceous earth, alumina, carbon, etc. The precipitated material is then recovered from the aqueous reaction mixture and is dried and reduced in the presence of hydrogen at temperatures in the range of 300–450° C. for an extended period of time.

The catalyst may be composed of nickel borate alone, or it may be a mixed catalyst such as a mixed nickel aluminum borate catalyst, a nickel borate-carbonate catalyst, or a mixed nickel-aluminum borate-carbonate catalyst. Considerable variation is possible in the additional materials which may be present but the nickel borate appears to be the particularly effective component. The term "reduced nickel borate catalyst" as used herein and in the claims is intended to include any nickel borate catalyst whether it contains added components or not. The preparation of the simple nickel borate catalyst as well as various mixed catalysts will be illustrated in the examples.

In preparing primary amines by employing this type of catalyst, the fatty nitrile, the catalyst, and ammonia are placed in an autoclave, and the autoclave subjected to a high hydrogen pressure at temperatures within the approximate range of 110–150° C. Hydrogen pressures in excess of 100 pounds per square inch are desirable and usually at least 200 pounds per square inch are employed. Under these conditions the time required for reduction of the nitrile may vary within the approximate range of 20 minutes to 2 hours. Higher pressures up to 1000 pounds per square inch or more may be employed where high pressure equipment is available.

In the production of secondary amines the reaction is conducted at temperatures within the range of about 170–230° C. The hydrogen pressure employed may be of the same order of magnitude as that employed for the primary amine. In the production of secondary amines, however, it is desirable to vent periodically the ammonia formed during the reaction. The reaction period for the secondary amines is very short and may be of the order of magnitude of from 3 to 20 minutes.

The following examples will serve to illustrate the invention:

Example 1

A nickel borate catalyst was prepared as follows: Borax (65.5 g.) and filter aid (30 g.) were added to 500 ml. of water and were heated to boiling, dissolving the borax. Nickel borate hexahydrate (50 g.) was dissolved in 500 ml. of boiling water and added to the borax-filter aid mixture. Boiling was then continued for one hour, after which the slurry was filtered and the filter cake washed and dried.

Fifteen grams of this raw catalyst were reduced in a stream of hydrogen at 450° C. for 4 hours, and were then added to stearic nitrile (265 g.), and the stearic nitrile converted to secondary octadecylamine as follows: The reactants were placed in a 1-liter Parr autoclave equipped with a propeller-type stirrer and an air-driven stirrer motor. The reaction vessel was heated to 170° C. with slow agitation. Heating was discontinued and hydrogen was admitted to 200 p. s. i. g. and the stirrer accelerated to 1,000–2,000 R. P. M. As the reaction progressed the hydrogen pressure decreased. When it reached 100 p. s. i. g. hydrogen was again admitted to 200 p. s. i. g. and the reaction continued. When the pressure had again reduced to 100 p. s. i. g. the system was vented to the atmosphere, closed, and again subjected to 200 p. s. i. g. hydrogen pressure. This cycle was repeated until no further pressure drop occurred, indicating the completion of the reaction. The exothermic nature of the reaction caused the reaction temperature to increase to about 230° C. The time required for reaction was 5½ minutes. The reaction mixture was filtered to remove the catalyst and the filtrate was distilled under high vacuum to yield 85.5% of the theoretical quantity of secondary octadecylamine. B. P. 250–255° C. at 0.1 mm. Hg.

*Example 2*

Fifteen grams of the raw catalyst described in Example 1 were reduced at 450° C. and added to stearic nitrile (265 g.). The hydrogenation was carried out in the Parr autoclave described in Example 1. Ammonia (27 g.) was added to the autoclave under pressure and the reaction was carried out as follows: The reaction mixture was heated to about 122–132° C. and hydrogenated at 600–800 p. s. i. g. total hydrogen-ammonia pressure with continual addition of hydrogen to the autoclave. It was necessary to supply heat to maintain this reaction temperature. The time required for complete reaction was 120 minutes. The product was worked up as described in example 1, and the yield was 94% of the theoretical yield of primary octadecylamine. The product had an amine number of 205.5. B. P. 125–130° C. at 0.1 mm. Hg.

*Example 3*

Borax (128 g.) and filter aid (96 g.) were added to 1 liter of water and were heated to boiling, dissolving the borax. Nickel nitrate hexahydrate (160 g.) was dissolved in 1 liter of boiling water and added to the borax-filter aid mixture. The resulting slurry was boiled one hour. Sodium carbonate solution (10%) was then added to make the slurry slightly alkaline to phenolphthalein. Boiling was continued for 15 minutes, after which the slurry was filtered. The filter cake was washed thoroughly and dried at 100° C. The raw catalyst was ground lightly.

Fifteen grams of this raw catalyst were reduced in a stream of hydrogen at 450° C. for 4 hours, and were then added to stearic nitrile (265 g.). The reduction was then conducted as described in Example 1, the time required for complete reaction being 5 minutes. The yield of secondary octadecylamine was 89.5% of theory.

*Example 4*

Fifteen grams of raw catalyst described in example 3 were reduced and added to stearic nitrile (265 g.). The conversion of the nitrile to primary octadecylamine was conducted as described in Example 2, in the presence of 35.5 g. of ammonia. The time required for complete reaction was 40 minutes. The yield of primary octadecylamine was 95.4%; amine number 208.2.

*Example 5*

Fifteen grams of the raw catalyst described in example 3 were reduced and added to 300 g. of dodecanitrile in a Magnedash autoclave. Ammonia (28.6 g.) was added and the hydrogenation was carried out as described in Example 4. The time for complete reaction was 200 minutes. The yield of distilled primary dodecylamine was 96.5%. The boiling point was 60–65° C. at 0.1 mm.; amine number 302.2 (theory 302.8).

*Example 6*

Fifteen grams of raw catalyst described in example 3 were reduced and added to 250 g. of dodecanitrile. The hydrogenation to secondary dodecylamine was carried out by the same procedure described in Example 1. The yield of distilled secondary dodecylamine was 71%, the boiling point 150–155° C. at 0.1 mm.; amine number 157.4 (theory 158.1).

*Example 7*

A catalyst was prepared as follows: Aluminum chloride (16 g.), borax (128 g.), and filter aid (96 g.) were added to 1 liter of water and boiled for 20 minutes. Nickel nitrate hexahydrate (160 g.) was dissolved in 1 liter of boiling water and added to the above mixture. Boiling was continued for 1 hour, after which sodium carbonate solution was added until the filtrate from a small portion of the slurry was alkaline to phenolphthalein. The slurry was then filtered and the filter cake washed thoroughly with distilled water. The filter cake was then dried at 100° C. overnight and was ground lightly.

Fifteen grams of this raw catalyst were reduced in a stream of hydrogen for 4 hours at 450° C. The reduced catalyst was added to 265 g. of stearic nitrile and the reaction conducted as described in Example 1. The time required for reaction was 4½ minutes. The yield of secondary octadecylamine was 79.1%, boiling point 250–255° C. at 0.1 mm. mercury.

*Example 8*

A nickel-aluminum borate-carbonate catalyst was prepared as described in Example 7.

Thirteen grams of the raw catalyst were reduced in a stream of hydrogen at 330° C. for 3 hours, followed by 4½ hours at 450° C. The reduced catalyst thus prepared was added to 265 g. of stearic nitrile. The nitrile was converted to secondary octadecylamine as described in Example 1, the time required for reaction being 17½ minutes. 78.8% of secondary octadecylamine, boiling at 250–255° C. at 0.1 mm. mercury were obtained.

*Example 9*

A quantity of catalyst was prepared by reducing 15 g. of raw catalyst as described in Example 7, and was added to 265 g. of stearic nitrile. The mixture was sealed in the Parr autoclave and 22.4 g. of ammonia were added under pressure. The reaction was then carried out as described in Example 2. The time of reaction was 70 minutes. The yield of primary octadecylamine was 95.3%, boiling point 125–130° C. at 0.1 mm., amine number 207.7 (theory 208.5).

It will be apparent from the preceding examples that the present invention provides a novel process for the production of both primary and secondary fatty amines from fatty nitriles. The process may readily be controlled to produce high yields of either primary or secondary amines as desired.

While various modifications of the invention have been described, it will be apparent that other variations may be made without departing from the spirit of the invention.

We claim as our invention:

1. Process of producing fatty amines from fatty nitriles containing from 8 to 22 carbon atoms, which comprises subjecting said nitriles to reduction at a temperature within the approximate range of 110–230° C. and in the presence of hydrogen under pressure, and in the presence of a reduced nickel borate catalyst.

2. Process of preparing primary fatty amines from fatty nitriles containing from 8 to 22 carbon atoms, which comprises subjecting said fatty nitriles to hydrogenation at temperatures within the approximate range of 110–150° C. in the presence of hydrogen and ammonia under pressure, and in the presence of a reduced nickel borate catalyst.

3. Process of preparing secondary fatty amines from fatty nitriles containing from 8 to 22 carbon atoms, which comprises subjecting said nitriles to hydrogenation at temperatures within the approximate range of 170–230° C. in the presence of hydrogen under pressure, and in the presence of a reduced nickel borate catalyst, venting ammonia formed during the reaction, and continuing the hydrogenation to produce secondary fatty amines.

References Cited in the file of this patent

UNITED STATES PATENTS

| | | |
|---|---|---|
| 1,215,334 | Bosch et al. | Feb. 13, 1917 |
| 1,338,709 | Sulzberger | May 4, 1920 |
| 2,122,644 | Harwood | July 5, 1938 |
| 2,160,578 | Schmidt | May 30, 1939 |
| 2,166,150 | Howk | July 18, 1939 |
| 2,166,151 | Howk | July 18, 1939 |
| 2,193,814 | Heard | Nov. 26, 1940 |
| 2,225,059 | Lazier | Dec. 17, 1940 |
| 2,292,949 | Lazier et al. | Aug. 11, 1942 |
| 2,355,356 | Young | Aug. 8, 1944 |
| 2,358,030 | Pool et al. | Sept. 12, 1944 |
| 2,690,456 | Reinfrew et al. | Sept. 28, 1954 |

FOREIGN PATENTS

| | | |
|---|---|---|
| 7,670 | Great Britain | June 24, 1915 |
| 282,083 | Great Britain | Nov. 8, 1928 |